United States Patent [19]

Klaassen

[11] Patent Number: 4,478,308
[45] Date of Patent: Oct. 23, 1984

[54] INDUSTRIAL VEHICLE HAVING AN ADJUSTABLE AND PIVOTAL ARMREST

[75] Inventor: Lambertus G. M. Klaassen, Oud Beijerland, Netherlands

[73] Assignee: De Rotterdamsche Droogdok MIJ B.V., Schiedam, Netherlands

[21] Appl. No.: 465,332

[22] Filed: Feb. 9, 1983

[30] Foreign Application Priority Data

Feb. 17, 1982 [NL] Netherlands .................. 8200614

[51] Int. Cl.³ ........................................... B60N 1/06
[52] U.S. Cl. ..................................... 180/326; 74/491; 180/332; 180/333; 180/334; 297/417
[58] Field of Search ............... 180/315, 316, 317, 318, 180/319, 320, 321, 322, 323, 324, 325, 326, 331, 332, 333, 334, 336; 297/411, 417; 74/471 XY, 471 R, 491

[56] References Cited

U.S. PATENT DOCUMENTS

| 4,140,200 | 2/1979 | Tucek ................................. 180/333 |
| 4,200,166 | 4/1980 | Hansen ........................... 297/411 X |
| 4,238,008 | 12/1980 | Higgins et al. ..................... 180/328 |

FOREIGN PATENT DOCUMENTS

| 2754543 | 6/1978 | Fed. Rep. of Germany ...... 180/326 |
| 1495795 | 8/1967 | France . |
| 91840 | 7/1968 | France . |
| 2285498 | 4/1976 | France . |
| 2388692 | 4/1978 | France . |
| 7903523 | 5/1979 | Netherlands . |
| 7903524 | 5/1979 | Netherlands . |
| 2068719 | 8/1981 | United Kingdom . |

Primary Examiner—Joseph F. Peters, Jr.
Assistant Examiner—Mitchell J. Hill
Attorney, Agent, or Firm—Wood, Dalton, Phillips, Mason & Rowe

[57] ABSTRACT

The invention relates to an industrial vehicle comprising a frame supported by ground wheels and/or caterpillars or the like. A driver seat is supported by said frame and provided with at least one armrest (elbow rest) and one or more control-members disposed near the elbow rest for controlling the movements of the vehicle and/or members connected with the vehicle. The elbow rest and the control-member(s) are disposed near the top end of a supporting column which is pivotable about a pivotal shaft located near the bottom side of the column and extending transversely of the longitudinal axis of the driver seat and fixable in at least two positions.

10 Claims, 7 Drawing Figures

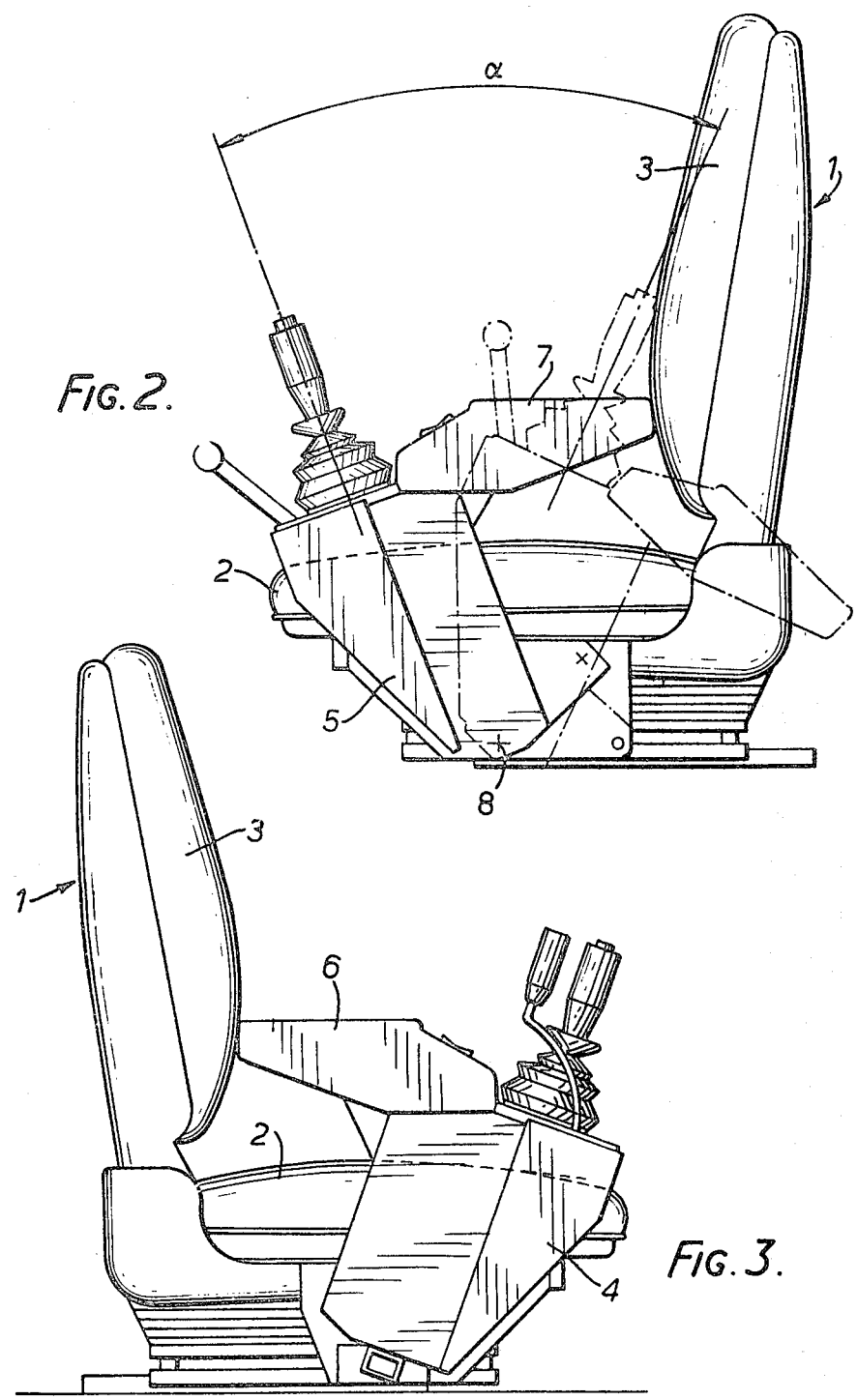

INDUSTRIAL VEHICLE HAVING AN ADJUSTABLE AND PIVOTAL ARMREST

The invention relates to an industrial vehicle comprising a frame supported by ground wheels and/or caterpillars or the like and a driver seat supported by said frame and provided with at least one elbow rest and one or more control-members connected near the elbow rest for controlling movements of the vehicle and/or of implements connected with the vehicle.

In such industrial vehicles, for example, draglines, bulldozers, agricultural tractors or the like, there is frequently relatively little space for locating the driver seat. Nevertheless it is desirable for the driver of the vehicle to sit easily on the seat or to easily leave the same.

According to the invention this can be achieved by locating the elbow rest and the control-member(s) near the top end of a supporting column which is pivotable about a pivotal shaft located near the bottom side of the column and extending transversely of the longitudinal axis of the driver seat and fixable in at least two positions.

The construction embodying the invention permits of setting the elbow rest with the control-member(s) in a first position, in which the elbow rest can provide a satisfactory rest for the arm of a person sitting on the driver seat, whilst the control-member(s) is (are) within easy reach of the person's hand, and in a second position, in which the elbow rest and the control-member(s) leave free at least the foremost part of the driver seat on the side concerned so that one can easily step off or sit down on the driver seat, as the case may be.

According to a second aspect of the invention the elbow rest and the control-member(s) together with the column are adjustable in a direction of height so that the position of the elbow rest and the control-member(s) can be adapted to the stature of the person controlling the vehicle so that easy comfort is ensured.

The invention will be described more fully hereinafter with reference to an embodiment of the construction in accordance with the invention shown in the accompanying Figures.

FIG. 2 is a side elevation of the driver seat of FIG. 1 in the direction of the arrow II in FIG. 1.

FIG. 3 is a side elevation of the driver seat of FIG. 1 in the direction of the arrow III in FIG. 1.

Figure 1:
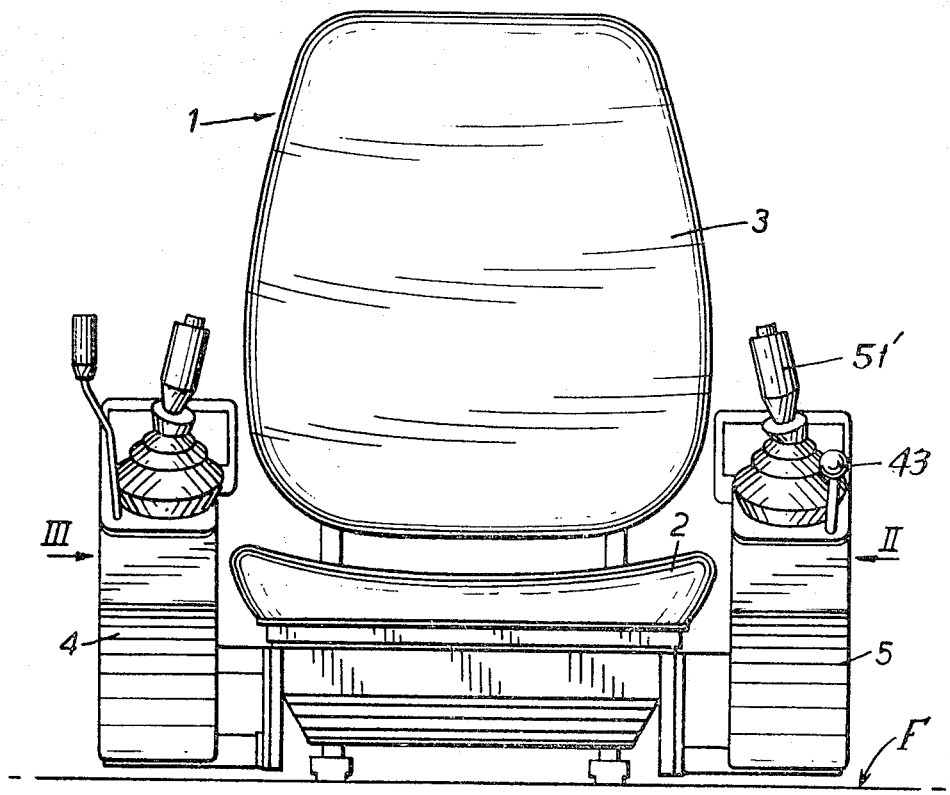
FIG. 1 is a front view of a driver seat embodying the invention.

FIGS. 1 to 3 show a driver seat 1 embodying the invention, which is provided with a seat cushion 2 and a back 3. The driver seat 1 can be fastened in an appropriate, known manner to a suitable frame part F of an industrial vehicle.

On both sides of the seat cushion 2 more or less box-shaped columns 4 and 5 extend in upward direction. To each column is fastened the end of an elbow rest 6 and 7 respectively extending rearwardly from the column.

In the embodiment shown one of the columns i.e. column 5 is pivotable with respect to the driver seat 1 about a horizontal pivotal shaft 8 extending at right angles to the longitudinal axis of the driver seat 1. The column 5 with the elbow rest 7 can be turned rearwardly from the position indicated by solid lines in FIG. 2 through an angle α of, in this embodiment, about 45° towards the back 3 into the position indicated by broken lines. It is obvious that when the column with the elbow rest is in the position indicated by broken lines at least the foremost part of the side of the seat cushion z is left free so that one can easily sit down on the driver seat. After the driver is seated, the column 5 and the elbow rest 7 fastened thereto can be turned back into the position of normal operation indicated by solid lines in FIG. 2.

The structural design of the pivotable column and the associated parts will be described more fully hereinbelow with reference to FIGS. 4 to 6.

Figure 4:
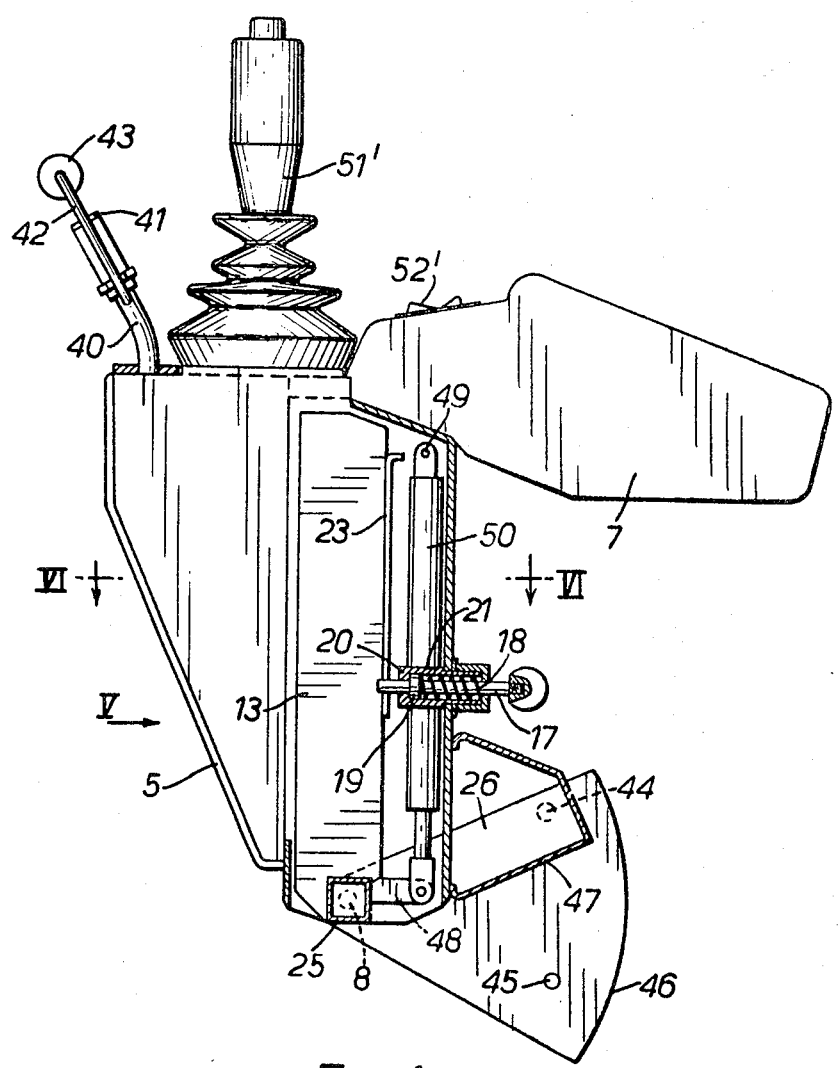
FIG. 4 shows on an enlarged scale partly in a sectional view and partly in an elevational view a column with an elbow rest and control-members supported by the column.
Figure 5:
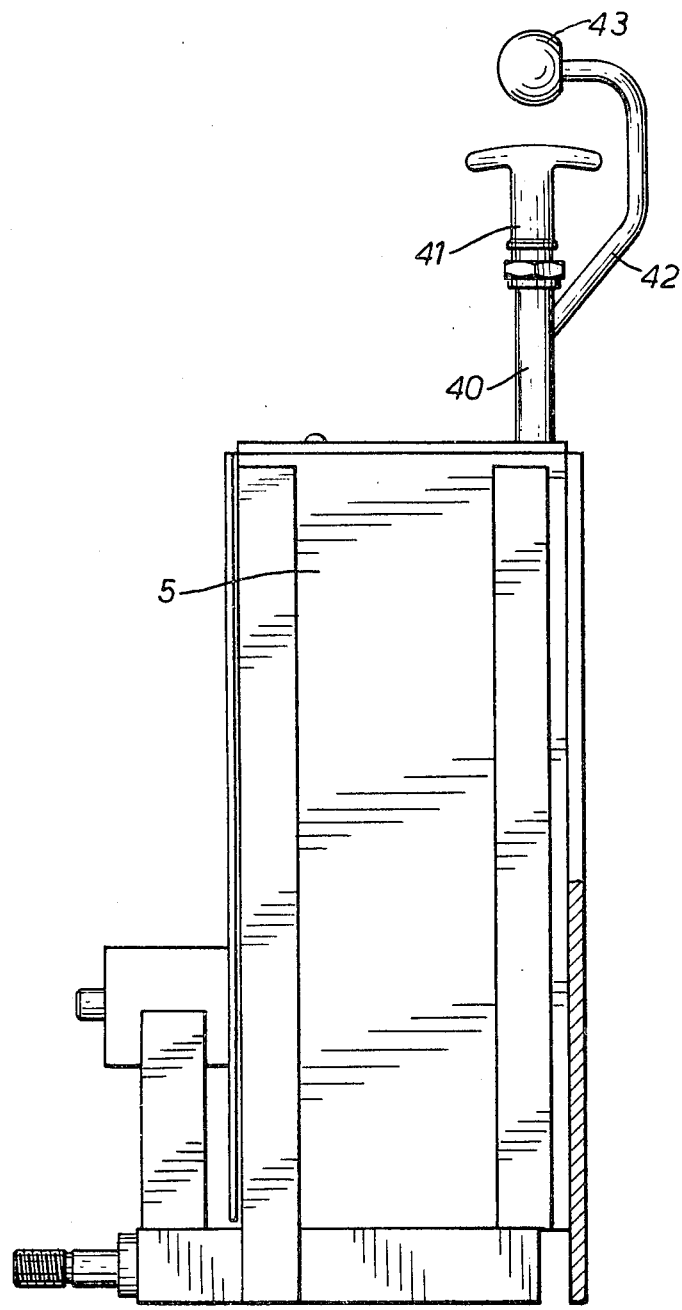
FIG. 5 shows the column of FIG. 4 with control-members connected herewith taken in the direction of the arrow V, partly in an elevational view and partly in a sectional view.
Figure 6:
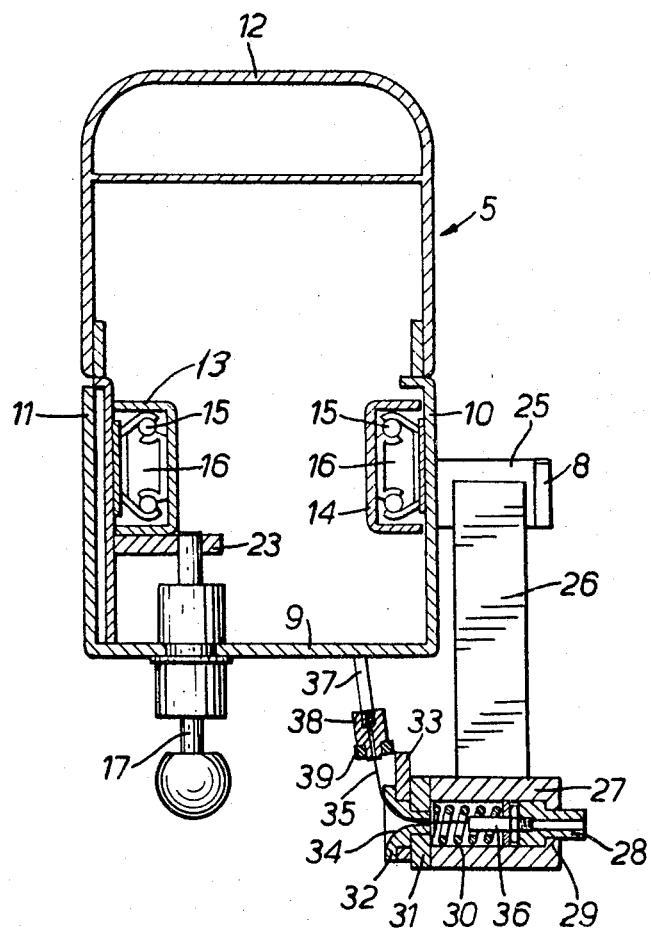
FIG. 6 is a cross-sectional view taken generally along the line VI—VI in FIG. 4.

In particular it will be apparent from FIGS. 4 and 6 that the column 5 has an at least essentially box-shaped structure, the column having a front wall 9, two relatively parallel sidewalls 10 and 11 and a rear wall 12.

Inside the column 5, a generally upright support member is defined by two U-shaped beams 13 and 14 which extend in the longitudinal direction of the column so that the relatively parallel limbs of the beams are directed towards the nearest sidewall. Between the limbs of the channel-section beams 13 and 14 are located guide rails 16 having balls 15 co-operating with the channel-section beams 13 and 14, said guide rails being fastened to the sidewalls of the column 5 in a manner such that the column 5 is slidable in the longitudinal direction of the channels-section beams.

In order to fix the column 5 in a desired position relative to the channel-section beams, there is provided a locking pin 17, the end of which protrudes from the column and which is surrounded by a spring 18 tending to urge the locking pin 17 to the left as viewed in FIG. 4 until a stop 19 fastened to the pin strikes a shoulder 20 of a sleeve 21 fastened to the column and accommodating the locking pin. In this position shown in FIG. 4 the end of the locking pin protruding out of the sleeve extends in a hole in a strip 23 (FIG. 4) fastened to the beam 13. The strip 23 has a plurality of holes (not shown) lying one above the other and the end of the locking pin located in the column 5 can be optionally inserted into one of said holes to fix the column 5 at the desired height with respect to the beams 13 and 14.

From FIG. 4 it will furthermore be apparent that the lower ends of the channel-section beams 13 and 14 are fastened to a beam 25 extending orthogonally to said beams 13 and 14. The end of the beam 25 protruding out of the column 5 is rotatable about the shaft 8 fastened to the frame supporting the driver seat 1.

To the end of the beam 25 protruding out of the column 5 is furthermore fastened an arm 26 extending transversely of said beam. The end of the arm 26 remote from the beam 25 is provided with a sleeve 27, in which a locking pin 28 is located, one end of which protrudes out of the sleeve 27. In the position shown in FIG. 6 a thickened part of said end located in the sleeve is in contact with a shoulder 29 formed near an end of the sleeve 27. The sleeve 27 furthermore accommodates a compression spring 30 enclosed between the locking pin 28 and a ring 31 fastened to one end of the sleeve 27. A supporting plate 33 is clamped tight to the ring by means of a clamping sleeve 32 having a stepped outer circumference.

The clamping sleeve 32 has a passage 34 flaring in trumpet fashion in a direction away from the interior of the sleeve 27. Through this passage 34 is passed the end of an inner cable 35 of a Bowden cable. Said end of the inner cable 35 is coupled with the locking pin 28 with the aid of a length of wire 36.

One end of the outer cable 37 of the Bowden cable is fastened with the aid of a tie sleeve 38 to an ear 39 welded to the plate 33. The Bowden cable extends upwards through the interior of the column 5 and the top end of the outer cable of the Bowden cable is fastened to one end of a length of tube 40 arranged on top of the column. The top end of the inner cable of the Bowden cable is fastened to one end of a handle 41 protruding above the length of tube, said end being slidable in said tube. (FIG. 5). U-shaped bracket 42 fastened to the tube 40 has an end with a knob 43 located above the handle 41.

It will be obvious that a person sitting on the driver seat can put his hand on the knob 43 and pull by two fingers the handle 41 upwards so that via the inner cable of the Bowden cable the locking pin 28 can be fully withdrawn into the sleeve 27 against the action of the spring 30. When the handle 41 is released, the locking pin will again move outwards by the spring force.

In the position in which the end of the locking pin 28 protrudes out of the sleeve 27 the protruding end can be located in one of two holes 44 or 45 in a plate 46 fastened to the frame of the driver seat or of the vehicle respectively. The holes 44 and 45 are located on a circle, the centre of which is located on the axis of the shaft 8, whilst the angular distance between said holes is about 45°. In the normal operational position of the column 5, the locking pin will lie in the upper hole as is shown in FIG. 4 and in the turned position the locking pin will lie in the lower hole. In both positions the column 5 is effectively locked in place so that it can not turn about the shaft 8.

The part of the Bowden cable located in the column has a sufficient length to allow such a turn of the column. The inner cable can readily match the turning movement at the area of the bend in the clamping member 32 thanks to the trumpet-shaped form of the hole 36.

In order to screen the locking mechanism by means of which the column 5 can be guarded against a turn about the shaft 8 a screening hood 47 is provided, which is only shown in FIG. 4 for the sake of clarity.

In order to facilitate the adjustment in height of the column 5 a gas spring 50 is arranged between one end of an arm 48 fastened to the frame beam 25 and a pivotal shaft 49 fixedly connected with the column 5, the design of said gas spring being such that during the displacement of the column the weight of this displaceable assembly is at least substantially compensated for by the gas spring 50.

The top end of the column 5 is furthermore provided with vehicle control means in the form of a controlstick 51', which is adjustable with respect to the column and which may be coupled with a valve or the like for actuating means for the forward movement of the vehicle, for steering the vehicle and/or for controlling members connected with the vehiche such as a digging boom, a digging bucket or the like.

In the embodiment shown the elbow rest has furthermore incorporated in it rocking switches 52' with the aid of which the driver of the vehicle can transmit further actuating and/or control signals.

It will be obvious that thanks to the rearward pivoting of the column as well as the elbow rest and the control-members carried thereon taking and leaving the driver seat respectively can be done easily and rapidly even in those circumstances in which the driver seat is built in a small-size driver compartment. Moreover, since the column 5 with the associated members is adjustable in a direction of height the elbow rest and the control-members connected with the column can always be moved into the most effective position matching the stature of the driver of the vehicle.

It will generally be sufficient to provide the pivotability either of the column 4 or the column 5 to the right or to the left of the driver seat. The right-hand or the left-hand column may be chosen in dependence on the further structure of the vehicle. In the embodiment described it is column 5 which is pivotable. The column 4 is not pivotable, but otherwise its design is similar to that of column 5 so that column 4 is also adjustable in a direction of height in the same manner as described for the column 5.

Figure 7:
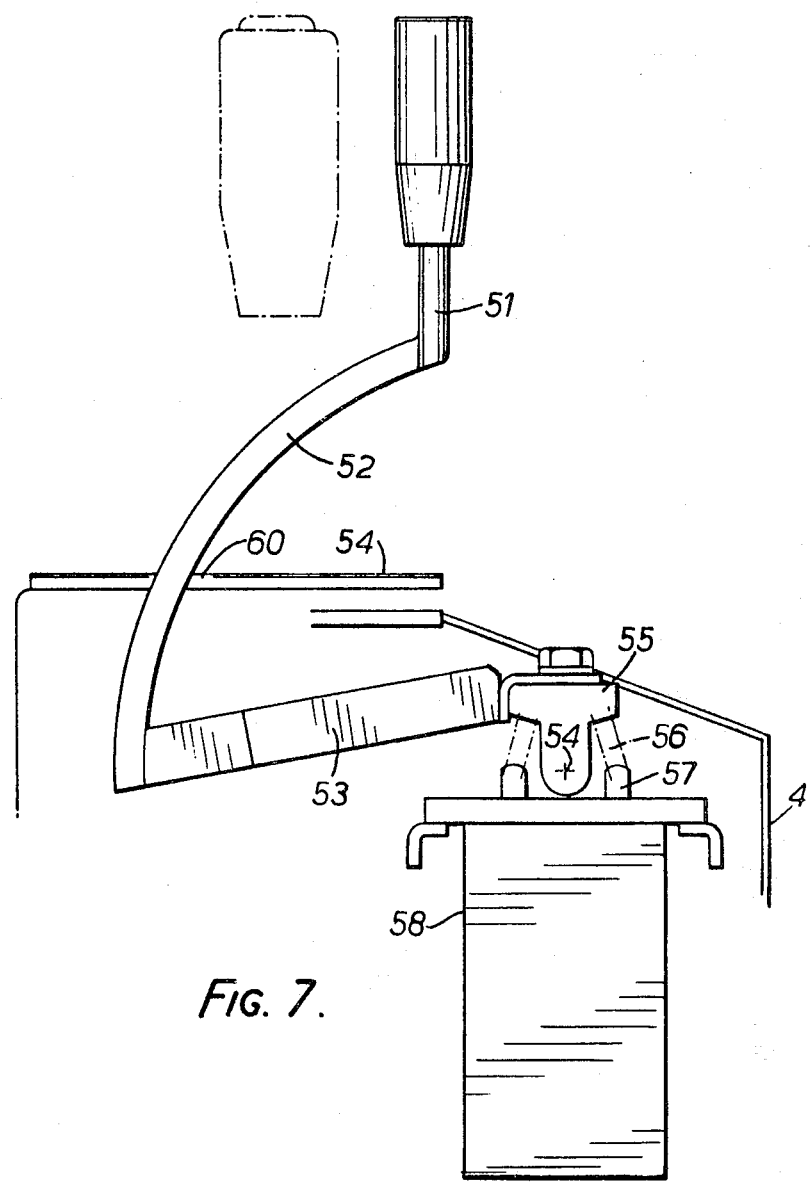
FIG. 7 shows a mode of arranging a control-member near the top end of the column.

In the embodiment shown a control-lever 51 extends above the column 4 for a bulldozer plate connected with the vehicle. As is shown in FIG. 7, the control-lever 51 comprises a tie piece 52 extending along an arc of a circle and having its lower end fastened to an arm 53. The end of the arm 53 remote from the tie piece 52 is fastened to a rocker 55 adapted to turn about a horizontal pivotal shaft 54 extending transversely of the direction of length of the vehicle. The rocker 55, through two springs 56 and setting pins 57 on both sides of the pivotal shaft 54, is capable of acting on a valve 58 mounted inside the column 4 and controlling the supply and/or drainage of pressurized fluid to the adjusting members of the bulldozer plate.

The centre of the curvature of the tie piece 52 is located on the pivotal shaft 54 and therefore passing this tie piece through the top wall 59 of the column 4 requires only a relatively small opening 60.

With this structure the control-lever for the bulldozer plate will also be always located within manual reach of the driver of the vehicle so that the control of this bulldozer plate will not require much force.

I claim:

1. An industrial vehicle comprising a frame, a driver seat supported by said frame and provided with at least one armrest mounted on an upwardly-extending supporting column together with control means for controlling the vehicle, said column being mounted on a generally upright support member for adjustment lengthwise of said support member, first locking means for locking said column in a desired height position with respect to said support member, means mounting said support member for pivoting about a pivot axis located near the lower end of said support member and extending crosswise of the seat whereby by pivoting said support member the armrest can be moved out of an operative position towards the rear side of the driver seat into an inoperative position and vice versa, second locking means for selectively locking said support member in either the operative or inoperative position of the armrest, and means for operating said second locking means including a handle mounted near the top end of the column.

2. An industrial vehicle as defined in claim 1 wherein said pivot axis is located approximately midway between the front and rear of the driver seat and generally at the level of the frame and the support member pivots through an arc of approximately 45° between operative and inoperative positions whereby the lower part of the column and support member move through a lesser distance than the upper part of the column and the armrest in moving between operative and inoperative positions.

3. An industrial vehicle as defined in claim 2 wherein said means for operating said second locking means includes a Bowden cable in said column and connected to said handle.

4. An industrial vehicle as defined in claim 1 wherein said first locking means includes a handle on the column below said armrest.

5. An industrial vehicle as claimed in claim 1 characterized in that said second locking means comprises a locking pin displaceable in its direction of length with the aid of a cable, a plate fixed to said frame into which said locking pin can be inserted into either one of two holes provided therein and relatively off-set through a given angular distance, said locking pin being located in a clamping sleeve having at one end a cable-receiving passage flaring in trumpet fashion in a direction away from the locking pin.

6. An industrial vehicle as claimed in claim 1 characterized in that the column is hollow for passing cables and/or leads connected with the vehicle control means.

7. An industrial vehicle as claimed in claim 1 characterized in that rocking switches are arranged near the front end of the armrest.

8. An industrial vehicle as claimed in claim 1 characterized in that inside the column a gas spring is provided for balancing the weight of the column and the vehicle control means displaceable therewith in a direction of height.

9. An industrial vehicle as claimed in claim 1 characterized in that a control-member for a bulldozer plate is arranged on the column.

10. An industrial vehicle as claimed in claim 1 characterized in that a control-member formed by a lever pivotable with respect to the column and being pivotable about a pivotal shaft located inside the column is provided with a curved tie piece which is passed through a hole in the top wall of the column, whilst the centre of the curvature of the curved tie piece is located on the pivotal shaft about which said lever is pivotable.

* * * * *